United States Patent [19]

Kimura et al.

[11] Patent Number: 4,555,559

[45] Date of Patent: Nov. 26, 1985

[54] METHOD FOR MAKING NOVEL COPOLYMER

[75] Inventors: Hiroshi Kimura; Ikurou Mori; Bunjirou Murai, all of Ohta, Japan

[73] Assignee: Toshiba Silicone Co., Ltd., Tokyo, Japan

[21] Appl. No.: 697,357

[22] Filed: Feb. 1, 1985

[30] Foreign Application Priority Data

Feb. 9, 1984 [JP] Japan .................................. 59-20892

[51] Int. Cl.[4] ............................................ C08G 77/06
[52] U.S. Cl. ...................................... 528/16; 528/25; 528/26; 528/28; 528/29
[58] Field of Search ...................... 528/16, 25, 26, 28, 528/29

[56]  References Cited

U.S. PATENT DOCUMENTS 4,026,827  5/1977  Steffen .................................. 528/16
4,082,719  4/1978  Liles et al. ............................ 528/16

Primary Examiner—Melvyn I. Marquis
Attorney, Agent, or Firm—Gary L. Loser

[57]  ABSTRACT

A method for making a novel copolymer, which comprises: reacting (A) a compound represented by the formula:

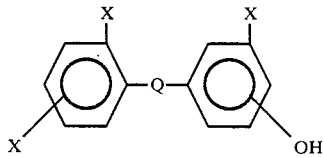

wherein Q represents $>C=O$ or the following formula:

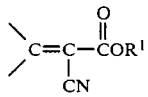

wherein each X may be either the same or different and each represents hydrogen atom or hydroxyl group, of which at least one is hydroxyl group, and $R^1$ represents an alkyl group having 1 to 18 carbon atoms, with (B) an epoxy group-containing trialkoxysilane and/or an epoxy group-containing dialkoxysilane in the presence of (C) an aluminum chelate compound represented by the formula:

$$Al(OR^2)_n L_{3-n}$$

wherein $R^2$ represents an alkyl group having 1 to 4 carbon atoms, L represents the following formula:

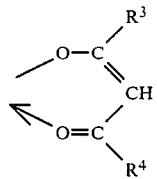

where $R^3$ represents an alkyl group having 1 or 2 carbon atoms, $R^4$ represents an alkyl group or an alkoxy group each having 1 or 2 carbon atoms, and n is an integer of 0, 1 or 2.

5 Claims, No Drawings

METHOD FOR MAKING NOVEL COPOLYMER

The present application claims priority of Japanese patent application Ser. No. 84/20892, filed Feb. 9, 1984.

BACKGROUND OF THE INVENTION

The present invention relates to a method for making a novel copolymer and, more particularly, to a method for making a novel copolymer which is usable as a UV absorber and the like.

In recent years, transparent plastics which are difficult to break and light in weight, are finding many uses in place of glass panels. For example, at the present time, transparent glass produced from synthetic organic polymers has frequently been employed in transportation means such as railroad cars, buses, etc., optical instruments and construction materials.

However, transparent plastics, while having the above advantages, are liable to suffer from scratches or damage to the surface, whereby its transparency may be lowered to damage its apperance. Also, transparent plastics have the disadvantage of being easily discolored when exposed to UV-rays such as sunlight for a long time.

Accordingly, various attempts have been made to improve the abrasion resistance of transparent plastics. For example, Japanese Provisional Patent Publications No. 2736/1976, No. 87736/1979 and No. 94971/1980 disclose compositions for coating, comprising an aqueous dispersion of colloidal silica and a hydrolyzable organosilane compound dissolved or dispersed in a hydrolyzing solvent such as an alcohol or water. Generally speaking, it has been attempted to prevent the plastics from UV-ray deterioration due to exposure to sunlight by coating the plastics with such a composition for coating in which a UV absorber is incorporated.

However, most UV absorbers have the problem of being removed from the composition during the heat curing step through, for example, volatilization. Further, they also have the disadvantage of worsening adhesion to the plastics.

For overcoming these disadvantages, a UV-absorber comprising an alkylcarbamyl adduct of alkoxysilyl or alkanoylsilyl is exemplified in Japanese Provisional Patent Publication No. 21476/1972, but this method is not only complicated in its steps, but also very disadvantageous in its economical aspects. Further, in Japanese Provisional Patent Publications No. 10591/1983 and No. 8766/1983, a UV-absorber is obtained by reacting the hydroxyl group of an aromatic UV-absorber such as 2,4-dihydroxybenzophenone, etc. with the epoxy group of an epoxy group-containing silane compound in the presence of tetramethylammonium chloride, but the film obtained by heat curing with addition of this product has the disadvantage of inferior heat resistance and water resistance.

SUMMARY OF THE INVENTION

An object of the present invention is to provide a method for making a novel copolymer which is usable for a UV-ray absorber and the like.

The method for making a novel copolymer according to the present invention comprises: reacting
(A) a compound represented by the formula:

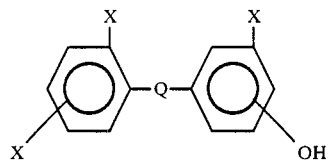

wherein Q represents $>C=O$ or the following formula:

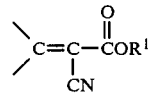

wherein each X may be either the same or different and each represents hydrogen atom or hydroxyl group, of which at least one is hydroxyl group, and $R^1$ represents an alkyl group having 1 to 18 carbon atoms, with (B) an epoxy group-containing trialkoxysilane and/or an epoxy group-containing dialkoxysilane in the presence of (C) an aluminum chelate compound represented by the formula:

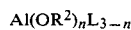

wherein $R^2$ represents an alkyl group having 1 to 4 carbon atoms, L represents a group of the following formula:

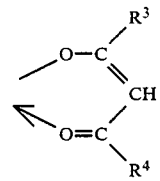

where $R^3$ represents an alkyl group having 1 or 2 carbon atoms, $R^4$ represents an alkyl group or an alkoxy group each having 1 or 2 carbon atoms, and n is an integer of 0, 1 or 2.

In other words, the specific feature of the present invention resides in the use of an aluminum chelate compound (C) as a catalyst in the reaction for obtaining a copolymer of Component (A) and Component (B) by reacting the hydroxyl group of an aromatic UV absorber of the prior art (A) with the epoxy group of an epoxy group-containing trialkoxysilane or an epoxy group-containing dialkoxysilane (B), and then reacting the hydroxyl group formed by ring opening of the epoxy group with the alkoxy groups of Component (B). Already, a UV absorber obtained by the reaction between the UV absorber of the prior art (A) and the silane compound having an epoxy group (B) is disclosed in Japanese Provisional Patent Publication No. 10591/1983. However, the method of the present invention and Japanese Provisional Patent Publication No. 10591/1983 are different in that the UV absorber in said Publication is a condensate (not a polymer, see Comparative example 2) between the UV absorber and the epoxy group-containing silane compound, which is obtained by use of an alkyl quaternary ammonium salt as the catalyst for the reaction, while that of the present invention is carried out in the presence of an aluminum chelate compound as a catalyst to obtain a copolymer of Component (A) and Component (B).

DESCRIPTION OF THE INVENTION

The Component (A) to be used in the present invention is a compound represented by the following formula:

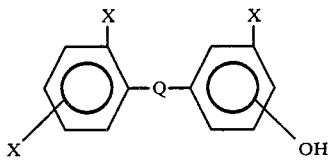

wherein Q and X have the same meanings as defined above.

The component is a compound which can be utilized alone as the UV-ray absorber, but in the present invention, it is used as a starting material for obtaining a copolymer with Component (B). Examples of such Component (A) are shown below:

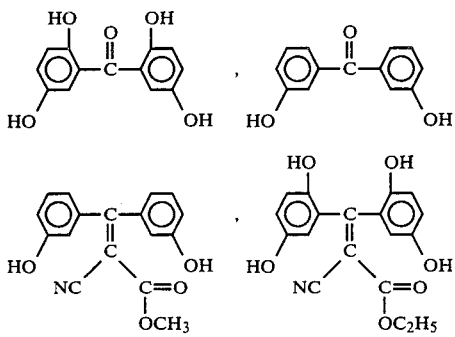

In view of its availability, 2,4-dihydroxybenzophenone is preferred.

The Component (B) to be used in the present invention is an epoxy group-containing trialkoxysilane or an epoxy group-containing dialkoxysilane, and it is required to have 2 or 3 alkoxy groups. However, it is preferred to have three alkoxy groups in order to permit the copolymer obtained by the present invention to be dissolved sufficiently, for example, in a coating composition having excellent abrasion resistance and undergo copolymerization with the polysiloxane in said composition. Examples of epoxy group-containing trialkoxysilanes may include γ-glycidoxypropyl trimethoxysilane, γ-glycidoxypropyl triethoxysilane, γ-glycidoxypropyl tripropoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane and the like. In view of its availability, an epoxy group-containing trimethoxysilane is preferred. Further, examples of the epoxy group-containing dialkoxysilane may include γ-glycidoxypropyl dimethoxysilane, γ-glycidoxypropylmethyl diethoxysilane, β-(3,4-epoxycyclohexyl)ethylmethyl dimethoxysilane and the like. In the present invention, two or more of Components (A) or (B) may be used.

The amount of Component (B) is not particularly limited, but preferably is from 1 to 3 moles and, more preferably, is from 1.2 to 2.5 moles, per mole of Component (A). At a level of less than 1 mole of Component (B) per mole of Component (A), the compound obtained by the present method is converted into a high molecular weight compound which is highly viscous and difficult to handle. Also, it becomes undesirably lowered in solubility when adding to a coating composition. On the other hand, when Composition (B) exceeds 3 moles, when the copolymer obtained from the present invention is added, as a IV absorber, to a coating composition, Component (A) participating in UV-ray absorption falls short of its absolute amount. Thus the amount of said absorber must be increased which results in lowering abrasion resistance, which is the principal object of improvement of the coating composition.

The Component (C) to be used in the present invention is an aluminum chelate compound represented by the following formula:

$Al(OR^2)_n L_{3-n}$ wherein $R^2$, L and n have the same meanings as defined above, and is used as a catalyst. Component (C) is inclusive of aluminum trisacetylacetonate, aluminum ethylacetoacetate bisacetylacetonate, aluminum bisethylacetoacetate acetylacetonate, aluminum diisopropoxymonoacetylacetonate, aluminum di-n-butoxymonoethylacetate, and the like. For ease of in handling and reaction, aluminum trisacetylacetonate is preferred.

The amount of the Component (C) to be formulated, which is not particularly limited, may preferably be 0.005 to 10 parts by weight and, more preferably 0.01 to 5 parts by weight, based on 100 parts by weight of the total amount of Component (A) and Component (B). When the amount of the Component (C) employed is less than 0.005 parts by weight, it will take a long time for the reaction, while an amount over 10 parts by weight will undesirably lower the stability of the composition when the copolymer obtained by the present invention is incorporated to the coating composition.

The reaction of the present invention is carried out in the presence of Component (C) by heating Components (A) and (B) generally at a temperature within the range of from 120° to 170° C. for 4 to 10 hours. The reaction may be carried out in the absence of a solvent or in a solvent capable of dissolving both Component (A) and Component (B). It is preferable to use a solvent, because the reaction can be more easily controlled. Examples of suitable solvents includes toluene, xylene, ethyl acetate, butyl acetate and the like. The reaction should preferably be continued, while distilling out the alcohol formed during the reaction.

From the above reaction, a copolymer having a molecular weight of about $10^3$ to $10^5$ can be obtained. Such a copolymer is available as the UV absorber and is particularly preferable for use in silicone type coating compositions. When said copolymer is employed for conventional coating composition as a UV absorber, and when a substrate such as plastics or the like is coated with the composition, it is possible to obtain a film having properties of excellent abrasion resistance, no deterioration or discoloration by UV-rays and good adhesiveness. Further, it may be used as an additive of coatings for general use (such as thermoplastic acryl, acryl-melamine, melamine-alkyd or polyester) and plastics.

According to the present invention, there is produced a novel copolymer composed of the hydroxyl group-containing aromatic compound and the epoxy group-containing trialkoxysilane or the epoxy group-containing dialkoxysilane.

EXAMPLES

The present invention is further illustrated by referring to the following examples and comparative examples, in which all the parts and percentages are by weight.

EXAMPLE 1

A mixture of 250 parts of 2,4-dihydroxybenzophenone, 375 parts of γ-glycidoxypropyl trimethoxysilane, 175 parts of toluene and 0.625 part of aluminum trisacetylacetonate was heated to 120° C. under stirring. The reaction was continued for about 10 hours, while removing the methanol formed during the reaction. The reaction temperature reached 140° C. Subsequently, under reduced pressure of 20-100 mmHg, toluene was evaporated at 140° C. to give a yellowish brown, transparent and viscous reaction product (S-1).

The molecular weight of the product was determined by GPC (Model HLC 802UR, produced by Toyo Soda Kogyo K.K.) with reference to the calibration curve of polystyrene to find that it was a copolymer with a weight average molecular weight of 2000.

EXAMPLE 2

From a mixture of 246 parts of 2,2',4,4'-tetrahydroxybenzophenone, 615 parts of β-(3,4-epoxycyclohexyl)ethyltrimethoxysilane, 250 parts of toluene and 5 parts of aluminum ethylbisacetoacetonate, following the same procedure as in Example 1, a reaction product (S-2), transparent with yellowish brown color and having a weight average molecular weight of 3000, was obtained.

EXAMPLE 3

A mixture of 214 parts of 4,4'-dihydroxybenzophenone, 472 parts of γ-glycidoxypropyltrimethoxysilane and 1 part of aluminum trisacetylacetonate was heated to 130° C. over about one hour. While maintaining the reaction temperature at 130° C., the reaction was continued while removing methanol for about 8 hours to obtain a reaction product (S-3). This product was transparent with yellowish brown color, viscous and had a weight average molecular weight of 1500.

EXAMPLE 4

Example 1 was repeated except for employing 300 parts of the compound of the formula shown below in place of 250 parts of 2,4-dihydroxybenzophenone to obtain a yellowish brown, transparent reaction product (S-4) with a weight average molecular weight of 2200.

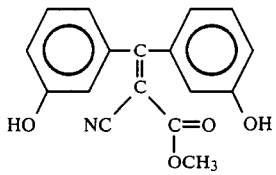

EXAMPLE 5

A mixture of 250 parts of 2,4'-dihydroxybenzophenone, 350 parts of γ-glycidoxypropylmethyldimethoxysilane, 175 parts of toluene and 0.625 part of aluminum trisacetylacetonate was treated in the same manner as in Example 1 to obtain yellowish transparent reaction product (S-5).

COMPARATIVE EXAMPLE 1

For comparative purpose, 2,4-dihydroxybenzophenone was employed as the UV absorber (R-1).

COMPARATIVE EXAMPLE 2

A mixture of 246 parts of 2,2',4,4'-tetrahydroxybenzophenone, 492 parts of β-(3,4-epoxycyclohexyl)ethyltrimethoxysilane and 5 parts of tetramethylammonium chloride was heated to 80° C. under stirring. While maintaining the reaction temperature at 80° C., the reaction was continued for about 8 hours to obtain a reaction product represented by the following formula:

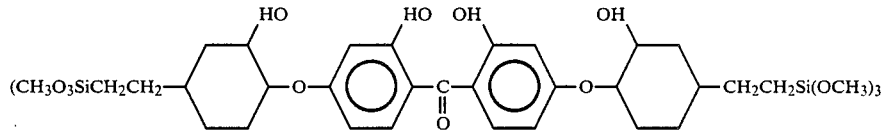

PREPARATION EXAMPLE 1

220 Parts of Ludox (trade name, produced by Du Pont de Nemours & Company, U.S.A., colloidal silica, solid concentration 30%, pH 8.2, average particle size 12 mμ) were added to a solution comprising 1 part of anhydrous acetic acid and 270 parts of methyltrimethoxysilane, and the reaction was carried out at 25° to 30° C. for 24 hours to obtain a reaction mixture with a solid content of 41%. After adjusting the solid content to 20% by addition of isobutanol, the mixture was filtered to obtain a composition for coating (B-1).

PREPARATION EXAMPLE 2

400 Parts of Snowtex (trade name, produced by Nissan Kagaku K.K., solid concentration 20%, pH 8.5, average particle size 15 mμ) were added to a solution comprising 1.5 parts of anhydrous acetic acid and 300 parts of methyltriethoxysilane, and the reaction was carried out at a temperature of 25° to 30° C. under stirring for 16 hours to obtain a reaction mixture with a concentration of the film forming components of 27.5%. Subsequently, 500 parts of isobutanol as the alcohol for azeotropic distillation were added and excessive water was removed in an azeotropic system of water-alcohol under a reduced pressure of 20-150 mmHg, to obain a reaction mixture with a solid content of 50%. After adding a solvent mixture comprising 25% of isopropyl alcohol, 50% of isobutyl alcohol and 25% of ethylene glycol monoethyl ether acetate to the solution to adjust the solid content to 20%, the mixture was filtered to obtain a composition for coating (B-2).

TEST EXAMPLE 1

UV-absorbers S-1 through S-4 prepared in Examples 1 to 4 and UV-absorbers R-1 and R-2 prepared in Comparative examples 1 and 2 were each added to 100 parts of the compositions B-1 and B-2 prepared in preparation examples 1 and 2 in amounts (parts) as indicated in Table 1 to obtain Samples 1-15. However, Sample 11 contains no UV-absorber, Samples 12-14 are systems in which 2,4-dihydroxybenzophenone was added, and Sample 15 is a sample for comparative purpose in which a 1:2 reaction product between 2,2',4,4'-tetrahydroxybenzophenone and β-(3,4-epoxycyclohexyl)ethyltrimethoxysilane (not the polymer as mentioned in the present invention) was added.

TABLE 1

| Sample No. | Coating composition | UV-ray absorber Kind | Amount, parts |
|---|---|---|---|
| 1 | B - 1 | S - 1 | 1.8 |
| 2 | B - 1 | S - 1 | 3.6 |
| 3 | B - 1 | S - 2 | 3.0 |
| 4 | B - 1 | S - 3 | 3.0 |
| 5 | B - 1 | S - 4 | 3.0 |
| 6 | B - 2 | S - 1 | 3.6 |
| 7 | B - 2 | S - 1 | 5.4 |
| 8 | B - 2 | S - 2 | 4.5 |
| 9 | B - 2 | S - 3 | 4.5 |
| 10 | B - 2 | S - 4 | 4.5 |
| Comparative examples: | | | |
| 11 | B - 1 | — | — |
| 12 | B - 2 | R - 1 | 1.6 |
| 13 | B - 2 | R - 1 | 0.8 |
| 14 | B - 2 | R - 1 | 1.6 |
| 15 | B - 2 | R - 2 | 3.2 |

Each of Samples 1-15 was applied according to the flow coating method on a polycarbonate plate (trade name: Lexan Sheet 9030, produced by General Electric Co.) which was coated with a primer (trade name: PH 91, produced by Toshiba Silicone Co., Ltd.), followed by heating at 120° C. for one hour to obtain a cured film. Further, on a polymethylmethacrylate plate (trade name: Acrypet VH, produced by Mitsubishi Rayon K.K.) was directly applied the same method for making a novel copolymer as above according to the spray coating method, followed by heating at 90° C. for 3 hours to obtain a cured film.

For these cured films, adhesion, heat shock resistance, hot water resistance, boiling water resistance, heat resistance, humidity resistance, abrasion resistance and weathering resistance were measured under the following conditions, respectively.

Adhesion

On the cured film were prepared 100 cross-cut checkers with 1 mm widths, and on the cross-cut surface was plastered Cellophane tacky tape, which was strongly drawn in the direction perpendicular to the film, and the state of the film peeled off was observed.

Heat Shock Resistance

By means of the heat impact tester produced by Tabai Seisakusho, the test specimen was exposed to respective temperature atmospheres of one cycle of from −30° C. for 3 hours to 120° C. for 3 hours, which cycle was repeated 5 times, and the appearance and adhesion of the film were observed.

Hot Water Resistance

After the test specimen was immersed in hot water at 65° C. for 200 hours, the appearance and adhesion of the film were observed.

Boiling Water Resistance

After the test specimen was immeresed in boiling water for one hour, adhesion was observed.

Heat Resistance

The test specimen was thrown into an atmosphere of 120° C. for 200 hours, and it was observed whether cracks were formed on the film or not.

Humidity Resistance

After the test specimen was thrown into an atmosphere of a temperature of 60° C. and a humidity of 98% for 200 hours, the state and adhesion of the film were observed.

Abrasion Resistance

By means of the Taber abrader produced by Toyo Seiki K.K., the surface of the test specimen was flawed under the conditions of the truck wheel CS-10, the load of 500 g and 500 cycles, and the degree of flaw is expressed in terms of haze value (ΔH, %) as analyzed by Direct-reading Haze Computer produced by Suga Tester K.K.

Weathering Resistance

After exposure for 2000 hours by means of Sunshine weathermeter weathering accelerating tester (produced by Toyo Seiki K. K.), appearance and adhesion were observed.

Table 2 shows the evaluation results when employing the polycarbonate test specimens, and Table 3 those when employing the polymethylmethacrylate test specimens.

TABLE 2

| | Evaluation Items: | | | | | |
|---|---|---|---|---|---|---|
| | Adhesion | Heat shock resistance | Boiling water resistance | Heat resistance | Abrasion resistance (ΔH %) | Weathering resistance |
| Sample No. | | | | | | |
| 1 | Good | No abnormality | No abnormality | No abnormality | 3.0 | Good |
| 2 | " | " | " | " | 4.5 | " |
| 3 | " | " | " | " | 5.0 | " |
| 4 | " | " | " | " | 3.7 | " |
| 5 | " | " | " | " | 5.0 | " |
| 6 | " | " | " | " | 2.0 | " |
| 7 | " | " | " | " | 3.5 | " |
| 8 | " | " | " | " | 3.1 | " |
| 9 | " | " | " | " | 3.7 | " |

TABLE 2-continued

| | Adhesion | Heat shock resistance | Boiling water resistance | Heat resistance | Abrasion resistance ($\Delta H$ %) | Weathering resistance |
|---|---|---|---|---|---|---|
| 10 | " | " | " | " | 4.0 | " |
| Comparative examples: | | | | | | |
| 11 | Good | No abnormality | No abnormality | No abnormality | 2.5 | Film spontaneously peeled off |
| 12 | Bad | Cracks formed | Cracks formed Bad adhesion | Cracks formed | 10.5 | Bad |
| 13 | Good | " | Bad adhesion | " | 2.5 | " |
| 14 | Bad | " | Cracks formed Bad Adhesion | " | 25.0 | Cracks formed Bad adhesion |
| 15 | Good | " | Cracks formed Bad adhesion | " | 9.5 | Cracks formed Bad adhesion |

TABLE 3

| | Adhesion | Hot water resistance | Humidity resistance | Abrasion resistance ($\Delta H$ %) | Weathering resistance |
|---|---|---|---|---|---|
| Sample No. | | | | | |
| 1 | Good | No abnormality | No abnormality | 4.5 | Good |
| 2 | " | " | " | 5.8 | " |
| 3 | " | " | " | 5.0 | " |
| 4 | " | " | " | 5.5 | " |
| 5 | " | " | " | 6.0 | " |
| 6 | " | " | " | 3.5 | " |
| 7 | " | " | " | 4.5 | " |
| 8 | " | " | " | 4.9 | " |
| 9 | " | " | " | 4.2 | " |
| 10 | " | " | " | 5.5 | " |
| Comparative examples: | | | | | |
| 11 | Bad | Bad adhesion | Bad adhesion | 20.0 | Bad |
| 12 | " | " | Film whitened Bad adhesion | 35.0 | " |
| 13 | " | " | Bad adhesion | 15.0 | " |
| 14 | " | " | Film whitened Bad adhesion | 25.5 | " |
| 15 | Good | " | Bad adhesion | 10.5 | Good |

TEST EXAMPLE 2

To the urethane coatings as shown below was added 2 weight % of a UV-absorber prepared in Example 5 to obtain Sample 16.

Composition of Urethane Coatings

Barnok D-210-80 (produced by Dainippon Ink K.K., trade name): 100 parts
Colonate L (produced by Nippon Polyurethane K.K., trade name): 25 parts
Sanol LS 292 (produced by Ciba Geigy Co., Ltd., trade name): 1 part For comparative purpose, Sample 17 which contains no UV-absorbers S-5 was prepared.

Sample 16 and Sample 17 were each coated on the ABS resin and heated at 80° C. for 30 minutes to obtain cured products, respectively. For these cured products, a weathering resistance test was carried out on a Sunshine weathermeter for 1000 hours, and the gloss retentions thereof were 80% in Sample 16 and 40% in Sample 17, respectively.

As clearly seen from the above results, the composition for coating in which was added the novel copolymer obtained by the method of the present invention has excellent adhesion, heat-resistant impact strength, hot water resistance, boiling water resistance, heat resistance, humidity resistance, abrasion resistance and weathering resistance. Accordingly, it is preferred for use as a surface protective coating for substrates composed of various materials such as polycarbonate resins, polymethyl methacrylate resins and others.

Further, the copolymer of the present invention is a preferred additive for paints since a paint to which was added the copolymer of the present invention is excellent in weathering resistance.

We claim:

1. A method for making a novel copolymer, which comprises: reacting (A) a compound represented by the formula:

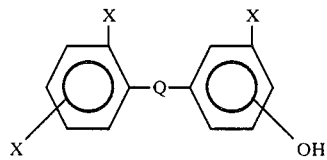

wherein Q represents $>C=O$ or the following formula:

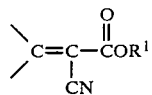

wherein each X may be either the same or different and each represents hydrogen atom or hydroxyl group, of which at least one is hydroxyl group, and $R^1$ represents an alkyl group having 1 to 18 carbon atoms, with (B) an epoxy group-containing trialkoxysilane and/or an epoxy group-containing dialkoxysilane in the presence of (C) an aluminum chelate compound represented by the formula:

$$Al(OR^2)_n L_{3-n}$$

wherein $R^2$ represents an alkyl group having 1 to 4 carbon atoms, L represents the following formula:

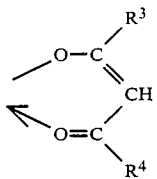

where $R^3$ represents an alkyl group having 1 or 2 carbon atoms, $R^4$ represents an alkyl group or an alkoxy group each having 1 or 2 carbon atoms, and n is an integer of 0, 1 or 2.

2. The method for making a novel copolymer according to claim 1, wherein Component (A) is 2,4-dihydroxybenzophenone.

3. The method for making a novel compolymer according to claim 1, wherein Component (B) is γ-glycidoxypropyltrimethoxysilane or β-(3,4-epoxycyclohexyl)ethyltrimethoxysilane.

4. The method for making a novel copolymer according to claim 1, wherein Component (B) is added in an amount of 1 to 3 moles per mole of Component (A).

5. The method for making a novel copolymer according to claim 1, wherein Component (C) is aluminum trisacetylacetonate.

* * * * *